(12) United States Patent     (10) Patent No.:   US 12,665,206 B2

Shah     (45) Date of Patent:   Jun. 23, 2026

(54) ELECTROLYTELESS FUEL CELL SYSTEM

(71) Applicant: Emanuel E Shah, Austin, TX (US)

(72) Inventor: Emanuel E Shah, Austin, TX (US)

( * ) Notice: Subject to any disclaimer, the term of this patent is extended or adjusted under 35 U.S.C. 154(b) by 1647 days.

(21) Appl. No.: 17/075,574

(22) Filed: Oct. 20, 2020

(65) Prior Publication Data

US 2021/0050605 A1     Feb. 18, 2021

Related U.S. Application Data

(63) Continuation-in-part of application No. 15/674,215, filed on Aug. 10, 2017, now abandoned.

(51) Int. Cl.
| | |
|---|---|
| *H01M 8/0258* | (2016.01) |
| *H01M 8/0247* | (2016.01) |
| *H01M 8/04089* | (2016.01) |
| *H01M 8/04858* | (2016.01) |

(52) U.S. Cl.
CPC ....... *H01M 8/0258* (2013.01); *H01M 8/0247* (2013.01); *H01M 8/04089* (2013.01); *H01M 8/04902* (2013.01)

(58) Field of Classification Search
CPC ............. H01M 8/0258; H01M 8/0247; H01M 8/04089; H01M 8/04902; H01M 8/04858
See application file for complete search history.

(56) References Cited

U.S. PATENT DOCUMENTS

2013/0216924 A1*   8/2013   Hillhouse ............... H01M 8/00
429/408

* cited by examiner

*Primary Examiner* — Stephen J Yanchuk

(57) ABSTRACT

An electrolyteless fuel cell system includes an anode; a cathode; an electrical grid between the anode and cathode; an anode side grid bias electrode; a cathode side grid bias electrode; and an electrical grid power supply, wherein the electrical grid is biased negative with respect to the anode through the anode side grid bias electrode and the electrical grid power supply, or wherein the electrical grid is biased positive with respect to the cathode through the cathode side grid bias electrode and the electrical grid power supply. In electrolyteless electrolyzer mode steam is introduced to the cathode, wherein the electrical grid is biased positive with respect to the cathode through the cathode side grid bias electrode and the electrical grid power supply.

8 Claims, 8 Drawing Sheets

ELECTROLYTELESS FUEL CELL SYSTEM

RELATED U.S. APPLICATION DATA

This U.S. patent application is continuation-in-part of pending U.S. application Ser. No. 15/674,215, filed on Aug. 10, 2017.

TECHNICAL FIELD OF THE INVENTION

The present invention generally relates to the field of fuel cell technology, and more particularly, to systems and methods for operating an electrolyteless fuel cell system.

BACKGROUND OF THE INVENTION

A fuel cell is an electrochemical cell that converts the chemical energy from a fuel into electricity through an electrochemical reaction of hydrogen containing fuel with oxygen or another oxidizing agent. Fuel cells are different from batteries in requiring a continuous source of fuel and oxygen (usually from air) to sustain the chemical reaction, whereas in a battery the chemical energy comes from chemicals already present in the battery. Fuel cells can produce electricity continuously for as long as fuel and oxygen are supplied.

There are many types of fuel cells but they all consist of an anode, a cathode, and an electrolyte that allows positively or negatively charged ions to move between the two sides of the fuel cell. Fuel cells can be classified by the type of electrolyte they use. The electrolyte plays a key role: it allows only the appropriate ions to pass between the anode and cathode. If free electrons or other substances could pass through the electrolyte, they would disrupt the chemical reaction. The main electrolyte types used today are alkali, molten carbonate, phosphoric acid, proton exchange membrane (PEM) and solid oxide (SO). The first three are liquid electrolytes; the last two are solids. The difference in startup time can be significant, ranging from 1 second for PEM fuel cells to 10 minutes for SO fuel cells.

For a proton exchange membrane fuel cell (PEMFC) design, a proton-conducting polymer membrane such as Nafion (a sulfonated tetrafluoroethylene based fluoropolymer-copolymer disc), acts as the electrolyte that separates the anode and cathode sides. At the anode, a catalyst (e.g., platinum) causes the fuel, for example, hydrogen ($H_2$) to undergo an oxidation reaction that generates protons ($H^+$) and electrons ($e^-$). After the reaction, the protons flow from the anode to the cathode through the electrolyte. At the same time, electrons are drawn from the anode to the cathode through an external circuit thereby producing direct current electricity. At the cathode, another catalyst (e.g. platinum) causes the hydrogen ions and electrons to react with oxygen ($O_2$), thereby forming water ($H_2O$). The half reactions at the cathode and anode, and the overall net reaction are shown below:

Anode (oxidation reaction): $H_2 \rightarrow 2H^+ + 2e^-$;

Cathode (reduction reaction): $\frac{1}{2}O_2 + 2H^+ + 2e^- \rightarrow H_2O$; and Net reaction (redox reaction): $H_2 + \frac{1}{2}O_2 \rightarrow H_2O$.

Solid oxide fuel cells (SOFCs) use a solid material, most commonly a ceramic material called yttria-stabilized zirconia (YSZ), as the electrolyte. Because SOFCs are made entirely of solid materials, they are not limited to the flat plane configuration of other types of fuel cells and are often designed as rolled tubes. They require high operating temperatures (800-1000° C.) and can be run on a variety of fuels including natural gas.

SOFCs are unique since negatively charged oxygen ions ($O^{-2}$) travel from the cathode (positive side of the fuel cell) to the anode (negative side of the fuel cell) instead of positively charged hydrogen ions travelling from the anode to the cathode, as is the case in all other types of fuel cells such as the PEM fuel cell. Oxygen is fed through the cathode, where it absorbs electrons to create oxygen ions. The oxygen ions then travel through the electrolyte to react with hydrogen at the anode. The reaction at the anode produces electricity and water as by-products. The chemical reactions for an SOFC system using hydrogen as the fuel can be expressed as follows:

Anode (oxidation reaction): $H_2 + O^{-2} \rightarrow H_2O + 2e^-$;

Cathode (reduction reaction): $\frac{1}{2}O_2 + 2e^- \rightarrow O^{-2}$; and

Net reaction (redox reaction): $H_2 + \frac{1}{2}O_2 \rightarrow H_2O$.

Carbon dioxide ($CO_2$) may also be a by-product depending on the fuel, but the carbon emissions from an SOFC system are less than those from a fossil fuel combustion plant.

The chemical reactions for an SOFC system using hydrogen and carbon monoxide (CO) as the fuel can be expressed as follows:

Anode (oxidation reaction): $H_2 + O^{-2} \rightarrow H_2O + 2e^-$;

Anode (oxidation reaction): $CO + O^{-2} \rightarrow CO_2 + 2e^-$; and

Cathode (reduction reaction): $O_2 + 4e^- \rightarrow 2O^{-2}$;

Net reaction (redox reaction): $H_2 + O_2 + CO \rightarrow H_2O + CO_2$.

One of the critical performance features of the hydrogen fuel cells is over potential. It is defined as voltage drop at anode and cathode. This voltage drop seriously affects the performance of a fuel cell. This occurs due to activation of ohmic polarization. Due to this more energy is required to drive the reaction than thermodynamically predicted and it affects the overall reaction kinetics of the fuel cell. The voltage drop at the anode is very low and therefore nickel can be used effectively with proper design. The over potential at the cathode is much higher and prior art fuel cells are designed to optimize cathode performance by various design techniques and material advances to overcome this problem. Even with high cost platinum cathode the over potential is a serious problem that requires specific design considerations. One of the parameters affecting the performance of a fuel cell cathode is temperature and with limitations on operating temperatures of many prior art fuel cells; the over potential problem is difficult to overcome. For a cathode to have low over potential, it requires both good ion conductivity and electron conductivity which is difficult to achieve in prior art fuel cells. Many advances have been made in this area and new cathode materials are constantly being developed. This can eventually help the fuel cell performance to come to more acceptable standards. With the availability of flexible operating temperatures, the over potential problems become more manageable.

In addition to electricity, fuel cells are non-polluting and produce water and depending on the fuel source, very small amounts of other emissions. However, individual fuel cells produce relatively small electrical potentials, typically only about 0.7 volts, with the energy efficiency being between about 40-60% due to heat loss. One of the difficult problems faced by prior art high temperature fuel cells is the unequal thermal expansion of different components of the fuel cell. This imposes limitations on the type of materials that can be used in the fuel cell and consequently, has a great effect on the cost, reliability and performance of the fuel cell. Therefore, there remains a need in the art for new systems and methods for increasing the desired attributes of a fuel cell.

SUMMARY OF THE INVENTION

The disclosure addresses these problems and more by providing a system and methods directed to an electrolyteless fuel cell.

Thus, in one embodiment the disclosure provides an electrolyteless fuel cell system, which includes an anode; a cathode; an electrical grid between the anode and cathode; an anode side grid bias electrode; a cathode side grid bias electrode; and an electrical grid power supply, wherein the electrical grid is biased negative with respect to the anode through the anode side grid bias electrode and the electrical grid power supply, or wherein the electrical grid is biased positive with respect to the cathode through the cathode side grid bias electrode and the electrical grid power supply.

In another embodiment, the disclosure provides methods for generating an electrical current in an electrolyteless fuel cell, which includes biasing an electrical grid negative with respect to an anode through an anode side grid bias electrode and an electrical grid power supply; oxidizing a fuel gas (e.g., hydrogen and/or carbon monoxide) at the anode to produce a positively charged fuel gas and a corresponding electron; reducing an oxidant (oxidizing agent, e.g., oxygen) at the cathode to produce a negatively charged oxidant; pulling the positively charged fuel gas through the negatively biased electrical grid to the cathode; forcing the corresponding electron through an external circuit to generate the electric current; and reacting the positively charged fuel gas with the negatively charged oxidant to generate at least one by product.

In another embodiment, the disclosure provides methods for generating an electrical current in an electrolyteless fuel cell, which includes biasing an electrical grid positive with respect to a cathode through a cathode side grid bias electrode and an electrical grid power supply; reducing an oxidant (oxidizing agent) at the cathode to produce a negatively charged oxidant; oxidizing a fuel gas at the anode to produce a positively charged fuel gas and a corresponding electron; pulling the negatively charged oxidant through the positively biased electrical grid to the anode; forcing the corresponding electron through an external circuit to generate the electric current; and reacting the positively charged fuel gas with the negatively charged oxidant to generate at least one by product.

DETAILED DESCRIPTION OF THE EMBODIMENTS

Figure 1:
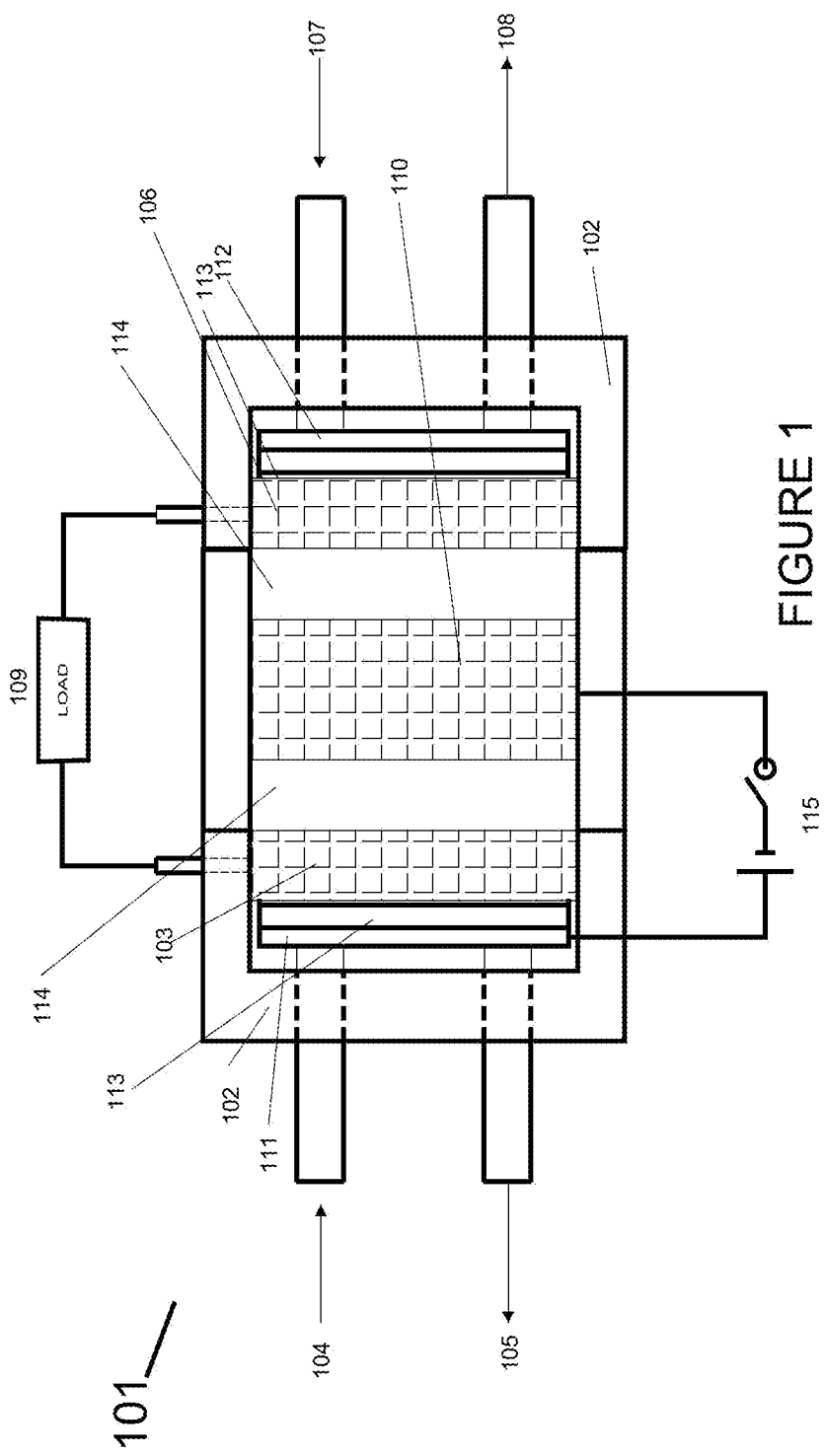
FIG. 1 illustrates an embodiment of an electrolyteless fuel cell system using hydrogen and/or carbon monoxide as the fuel source, and oxygen (air) as the oxidant.

The disclosure provides an electrolyteless fuel cell system, which includes an anode; a cathode; an electrical grid between the anode and cathode; an anode side grid bias electrode; a cathode side grid bias electrode; and an electrical grid power supply, wherein the electrical grid is biased negative with respect to the anode through the anode side grid bias electrode and the electrical grid power supply, or wherein the electrical grid is biased positive with respect to the cathode through the cathode side grid bias electrode and the electrical grid power supply.

In one aspect, the disclosure provides an electrolyteless fuel cell system, wherein the electrical grid is biased negative with respect to the anode, to create a potential difference between the electrical grid and the anode, wherein incoming hydrogen is used as a fuel source at the anode.

In another aspect, the disclosure provides an electrolyteless fuel cell system, wherein the negatively biased electrical grid pulls protons generated by oxidation of the incoming hydrogen at the anode, towards the electrical grid.

In another aspect, the disclosure provides an electrolyteless fuel cell system, wherein the negatively biased electrical grid repels electrons generated by oxidation of the incoming hydrogen at the anode, away from the electrical grid and to the anode.

In another aspect, the disclosure provides an electrolyteless fuel cell system, wherein the electrical grid is biased positive with respect to the cathode to create a potential difference between the electrical grid and the cathode, wherein incoming oxygen is used as an oxidant at the cathode.

In another aspect, the disclosure provides an electrolyteless fuel cell system, wherein the positively biased electric grid pulls oxygen anions generated by reduction of the incoming oxygen at the cathode, towards the electrical grid.

In another aspect, the disclosure provides an electrolyteless fuel cell system, which further includes a plurality of flow channels in the anode side grid bias electrode and in the cathode side biased electrode, wherein the plurality of flow channels in the anode side grid bias electrode allows incoming hydrogen to reach the anode, and wherein the plurality of flow channels in the cathode side bias electrode allows incoming oxygen to reach the cathode.

In another aspect, the disclosure provides an electrolyteless fuel cell system, which further includes a screen grid located between the electrical grid and the anode, or located between the electrical grid and the cathode, wherein the screen grid is maintained at an opposite polarity and at a lower potential to the electrical grid.

In another embodiment, the disclosure provides methods for generating an electrical current in an electrolyteless fuel cell, which includes biasing an electrical grid negative with respect to an anode through an anode side grid bias electrode and an electrical grid power supply; oxidizing a fuel gas (e.g., hydrogen and/or carbon monoxide) at the anode to produce a positively charged fuel gas and a corresponding electron; reducing an oxidant (oxidizing agent, e.g. oxygen) at the cathode to produce a negatively charged oxidant; pulling the positively charged fuel gas through the negatively biased electrical grid to the cathode; forcing the corresponding electron through an external circuit to generate the electric current; and reacting the positively charged fuel gas with the negatively charged oxidant to generate at least one by product.

In one aspect, the disclosure provides methods for generating an electrical current in an electrolyteless fuel cell, wherein the fuel gas includes hydrogen and/or carbon monoxide.

In another aspect, the disclosure provides methods for generating an electrical current in an electrolyteless fuel cell, wherein the negatively biased electrical grid repels electrons generated by oxidation of the fuel gas at the anode, away from the electrical grid and to the anode.

In another aspect, the disclosure provides methods for generating an electrical current in an electrolyteless fuel cell, which further includes a plurality of flow channels in the anode side grid bias electrode and in the cathode side biased electrode, wherein the plurality of flow channels in the anode side grid bias electrode allows the fuel gas to reach the anode, and wherein the plurality of flow channels in the cathode side bias electrode allows the oxidant fuel to reach the cathode.

In another aspect, the disclosure provides methods for generating an electrical current in an electrolyteless fuel cell, which further includes a screen grid located between the electrical grid and the anode, or located between the electrical grid and the cathode, wherein the screen grid is maintained at an opposite polarity and at a lower potential to the electrical grid.

In another embodiment, the disclosure provides methods for generating an electrical current in an electrolyteless fuel cell, which includes biasing an electrical grid positive with respect to a cathode through a cathode side grid bias electrode and an electrical grid power supply; reducing an oxidant (oxidizing agent, e.g. oxygen) at the cathode to produce a negatively charged oxidant; oxidizing a fuel gas (e.g., hydrogen and/or carbon monoxide) at the anode to produce a positively charged fuel and a corresponding electron; pulling the negatively charged oxidant through the positively biased electrical grid to the anode; forcing the corresponding electron through an external circuit to generate the electric current; and reacting the negatively charged oxidant with the positively charged fuel gas to generate at least one by product.

In one aspect, the disclosure provides methods for generating an electrical current in an electrolyteless fuel cell, wherein the oxidant (oxidizing agent) includes oxygen or air.

In another aspect, the disclosure provides methods for generating an electrical current in an electrolyteless fuel cell, wherein the fuel gas includes hydrogen and/or carbon monoxide.

In another aspect, the disclosure provides methods for generating an electrical current in an electrolyteless fuel cell, which further includes a plurality of flow channels in the cathode side grid bias electrode and in the anode side biased electrode, wherein the plurality of flow channels in the cathode side grid bias electrode allows the oxidant to reach the cathode, and wherein the plurality of flow channels in the anode side bias electrode allows the fuel gas to reach the anode.

In another aspect, the disclosure provides methods for generating an electrical current in an electrolyteless fuel cell, which further includes a screen grid located between the electrical grid and the anode, or located between the electrical grid and the cathode, wherein the screen grid is maintained at an opposite polarity and at a lower potential to the electrical grid.

A fuel cell has three main functional components: a first catalytic electrode that functions as an anode; a second catalytic electrode that functions as a cathode; and an electrolyte located between the two electrodes, which functions to transport charged ions between the two electrodes. The function of the anode is to oxidize gases such as hydrogen ($H_2$) and carbon monoxide (CO) into electrically charged ions such as protons ($H^+$) and carbon monoxide ions ($CO^+$), respectively, and electrons ($e^-$). The function of the cathode is to reduce a gases such as oxygen ($O_2$) into negatively charged oxygen ions ($O^{-2}$), which can combine with the electrically charged protons ($H^+$) and carbon monoxide ions ($CO^+$), along with the generated electrons ($e^-$) to form water ($H_2O$) and carbon dioxide ($CO_2$), respectively. The electrons (e–) generated at the anode are transported through an external circuit to the cathode. The function of the electrolyte located between the anode and the cathode, is to allow selected electrically charged particles to conduct through it. For example, it can allow either positively charged protons ($H^+$) and carbon monoxide ions ($CO^+$) to conduct though it or it can allow negatively oxygen ions ($O^{-2}$) to conduct through it, while blocking the flow of electrons ($e^-$). This function depends on the properties of the electrolyte selected.

By contrast, the disclosure provides a fuel cell system that does not use any electrolyte at all and therefore, all the problems relating to prior art electrolytes are eliminated. As described above, the function of the electrolyte to selectively allow either positively charged protons (H+) (or negatively charged oxygen ions ($O^{-2}$)) to conduct from the anode to the cathode (or from the cathode to the anode), while blocking the flow of electrons. It has been found that the function of the electrolyte can be performed by a negatively or positively biased electrical grid. Since the electrolyteless fuel system is not limited by the properties of the electrolyte, the desired electrochemical reactions can be achieved without the limitations and disadvantage of prior art electrolytes.

For example, one of the difficult problems faced by prior art high temperature fuel cells is the unequal thermal expansion of different components of the fuel cell. This imposes limitations on the type of materials that can be used in the fuel cell. This has great effect on the cost, reliability and performance of the fuel cell. With the presence of a negatively or positively biased electric grid and an air gap in the fuel cell, the requirements regarding matching the coefficient of expansion between different components are eliminated. With the availability of lower operating temperatures, the design of interconnects is also simplified. In addition, a lower cost fuel cell can be provided due to the low cost of nickel electrodes, which avoids the volatility of international markets for precious metals such as platinum, an inexpensive grid, and inexpensive cathode materials using low cost cermet. The electrolyteless fuel cell also avoids any toxic and corrosive electrolytes present in other fuel cells.

FIG. 1 illustrates an embodiment of an electrolyteless fuel cell system 101 using hydrogen as the fuel gas and oxygen (air) as the oxidant. The fuel cell system 101 includes a fuel cell housing 102; an anode 103; an anode side inlet 104 (for allowing hydrogen to enter), and an anode side outlet 105 (for allowing unused hydrogen to exit); a cathode 106; a cathode side inlet 107 (for allowing oxygen (air) to enter), and a cathode side outlet 108 (for allowing unused oxygen (air) and steam (water) produced to exit). The anode and cathode are normal electrodes, which may be made or nickel or other suitable metal, with their necessary catalytic properties. Also shown is an external electrical circuit 109, though which electrons generated at the anode 103 flow to the cathode 106. The housing is electrically insulated from the electrodes and the grid. All the connections to the anode, cathode and the grid are made through the power supply terminals only and no direct connection exists between the anode, cathode and the grid. The external load connections are made between the anode and the cathode.

The electrolyteless fuel cell system 101 also includes an electrical grid 110, which can be made of any suitable material, including non-toxic materials, and is able to operate at variable temperatures. The electrical grid 110 is mainly open space and because of that, the positively charged ions such as protons, as well as negatively charged ions such as oxygen ions, do not attach to the electrical grid.

The electrolyteless fuel cell system 101 also includes an anode side grid bias electrode 111, which includes a plurality of flow channels or grooved paths for flow of hydrogen entering and leaving the fuel cell system; and a cathode side grid bias electrode 112, which also includes a plurality of flow channels or grooved paths for flow of oxygen (air) entering and leaving the fuel cell system. A flow channel insulation material 113 is spaced between the anode side grid bias electrode 111 and the anode 103, as well as between the cathode side grid bias electrode 112 and the cathode 106. In addition, an air gap 114 is located between the anode 103 and the electrical grid 110, as well as between the cathode 106 and the electrical grid 110.

When using hydrogen as the fuel source and oxygen (air) as the oxidant in the electrolyteless fuel cell system 110, the electrical grid 110 can be biased negative with respect to the anode 103. This can be accomplished through a grid power supply 115, in which the negative side of the power supply is connected to the electrical grid 110, and the positive side of the of the power supply is connected to the anode side grid bias electrode 111. The grid power supply 115 will be isolated from the housing and disconnected from the cathode side grid bias electrode 112.

The hydrogen gas entering near the anode 103, by catalytic action of the anode, goes through the process of oxidation and is oxidized into positively charged protons and negatively charged electrons. The protons and electrons can then tend to move towards the cathode 106 side of the fuel cell due to the pressure of the incoming hydrogen entering the flow channels in the anode side grid bias electrode 111. In this embodiment, the electrical grid 110 is biased negative with respect to the anode 103 to create a potential difference between itself and incoming hydrogen. When the hydrogen is oxidized, this potential difference allows the electrical grid 110 to repel the electrons generated at the anode 103, and pull the protons generated at the anode 103 towards the cathode 106. At the cathode 106, the process of reduction causes the incoming oxygen (air) to be reduced to negatively charged oxygen ions, which then combine with the incoming generated protons and electrons to form steam (water) that can be exhausted through the cathode side outlet 108.

Figure 2:
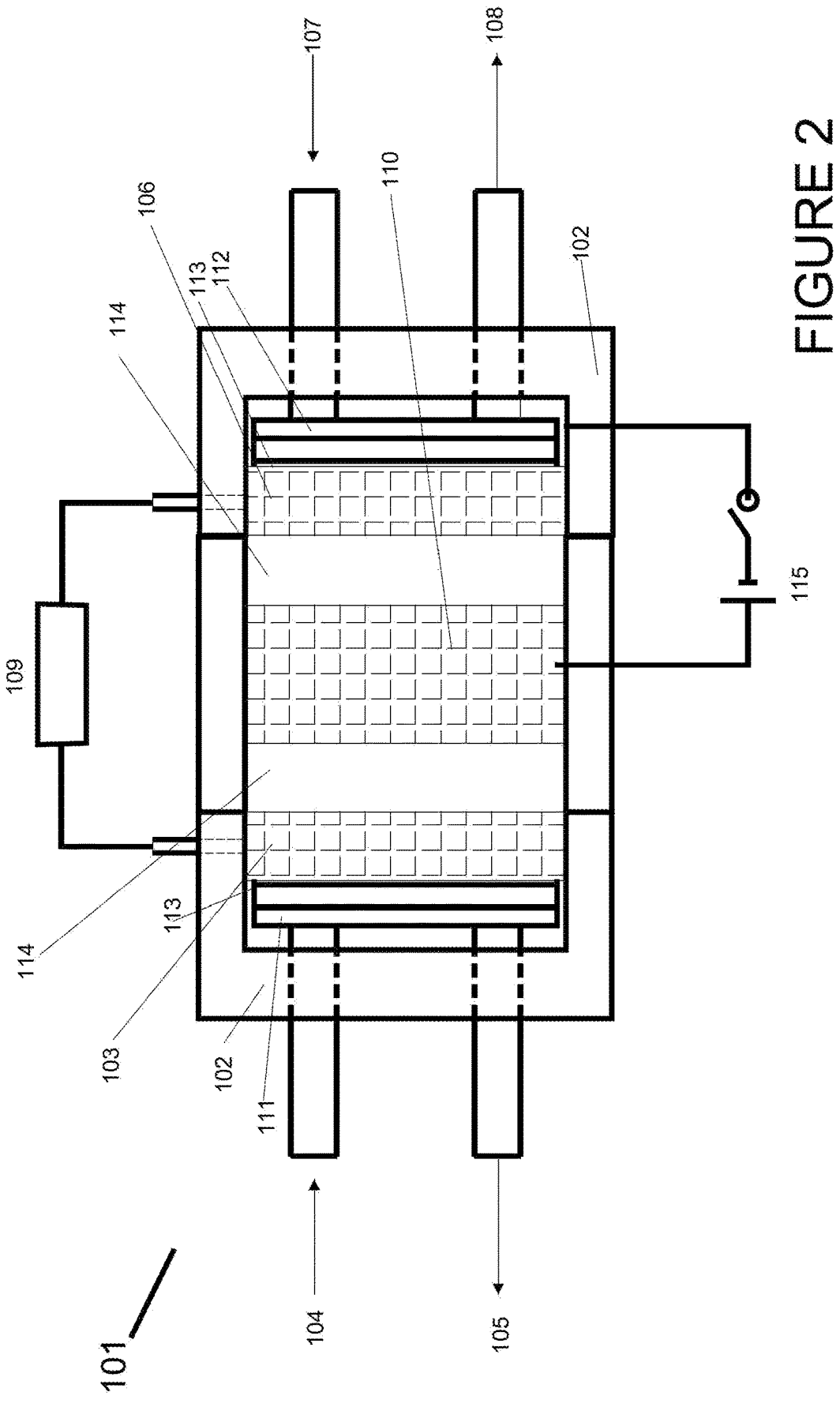
FIG. 2 illustrates an embodiment of an electrolyteless fuel cell system using hydrogen and/or carbon monoxide as the fuel source, and oxygen (air) as the oxidant.

FIG. 2 illustrates an embodiment of an electrolyteless fuel cell system 101 using hydrogen and/or carbon monoxide as the fuel gas, and oxygen (air) as the oxidant. As before, the fuel cell system 101 includes a fuel cell housing 102; an anode 103; an anode side inlet 104 (for allowing hydrogen and carbon monoxide to enter), and an anode side outlet 105 (for allowing unused hydrogen, carbon monoxide, and steam (water) produced to exit); a cathode 106; a cathode side inlet 107 (for allowing oxygen (air) to enter), and a cathode side outlet 108 (for allowing unused oxygen (air) to exit). The anode and cathode are normal electrodes with their necessary catalytic properties. Also shown is an external electrical circuit 109, though which electrons flow from the anode 103 to the cathode 106 internal reforming is performed at the anode area.

The electrolyteless fuel cell system 101 also includes an electrical grid 110, which can be made of any suitable material, including non-toxic materials, and is able to operate at variable temperatures. The electrical grid 110 is mainly open space and because of that, the positively charged ions such as protons and carbon monoxide ions, as well as negatively charged ions such as oxygen ions, do not attach to the electrical grid.

The electrolyteless fuel cell system 101 also includes an anode side grid bias electrode 111, which includes a plurality of flow channels or grooved paths for flow of hydrogen and/or carbon monoxide entering and leaving the fuel cell system; and a cathode side grid bias electrode 112, which also includes a plurality of flow channels or grooved paths for flow of oxygen (air) entering and leaving the fuel cell system. A flow channel insulation material 113 is spaced between the anode side grid bias electrode 111 and the anode 103, as well as between the cathode side grid bias electrode 112 and the cathode 106. In addition, an air gap 114 is located between the anode 103 and the electrical grid 110, as well as between the cathode 106 and the electrical grid 110.

When using hydrogen and/or carbon monoxide as the fuel source, and oxygen (air) as the oxidant in the electrolyteless fuel cell system 110, the electrical grid 110 can be bias positive with respect to the cathode 106. This can be accomplished through a grid power supply 115, in which the positive side of the power supply is connected to the electrical grid 110, and the negative side of the of the power supply is connected to the cathode side grid bias electrode 112. The grid power supply 115 will be isolated from the housing and disconnected from the anode side grid bias electrode 112.

The oxygen gas entering near the cathode 106, by catalytic action of the cathode, goes through the process of reduction and is reduced in to negatively charged oxygen ions. The oxygen ions can then tend to move towards the anode 103 side of the fuel cell due to the pressure of the incoming oxygen (air) entering the flow channels in the cathode side grid bias electrode 112. In this embodiment, the electrical grid 110 is biased positive with respect to the cathode 106 to create a potential difference between itself and incoming oxygen (air) gas. When the oxygen is reduced, this potential difference allows the electrical grid 110 to pull oxygen ions generated at the cathode 106 towards the anode 103. At the anode 103, the process of oxidation causes the incoming hydrogen and carbon monoxide to be oxidized to generate electrons and positively charged protons and carbon monoxide ions, which then combine with the incoming generated oxygen ions to form steam (water) that can be exhausted through the anode side outlet 105.

As described above, the function of the electric grid is to transfer positively charged hydrogen ions from the anode to the cathode or to transfer negatively charged oxygen ions from the cathode to the anode. The force exerted on the charged particles by the electrical grid is determined by the spacing between the electrical grid and the electrode from which the charged particles originated and the potential difference between the electrical grid and that electrode. The polarity of the electrical grid (biased negative with respect to the anode; or biased positive with respect to the cathode) determines which charged particles the electrical grid can transfer or repel.

Figure 3:
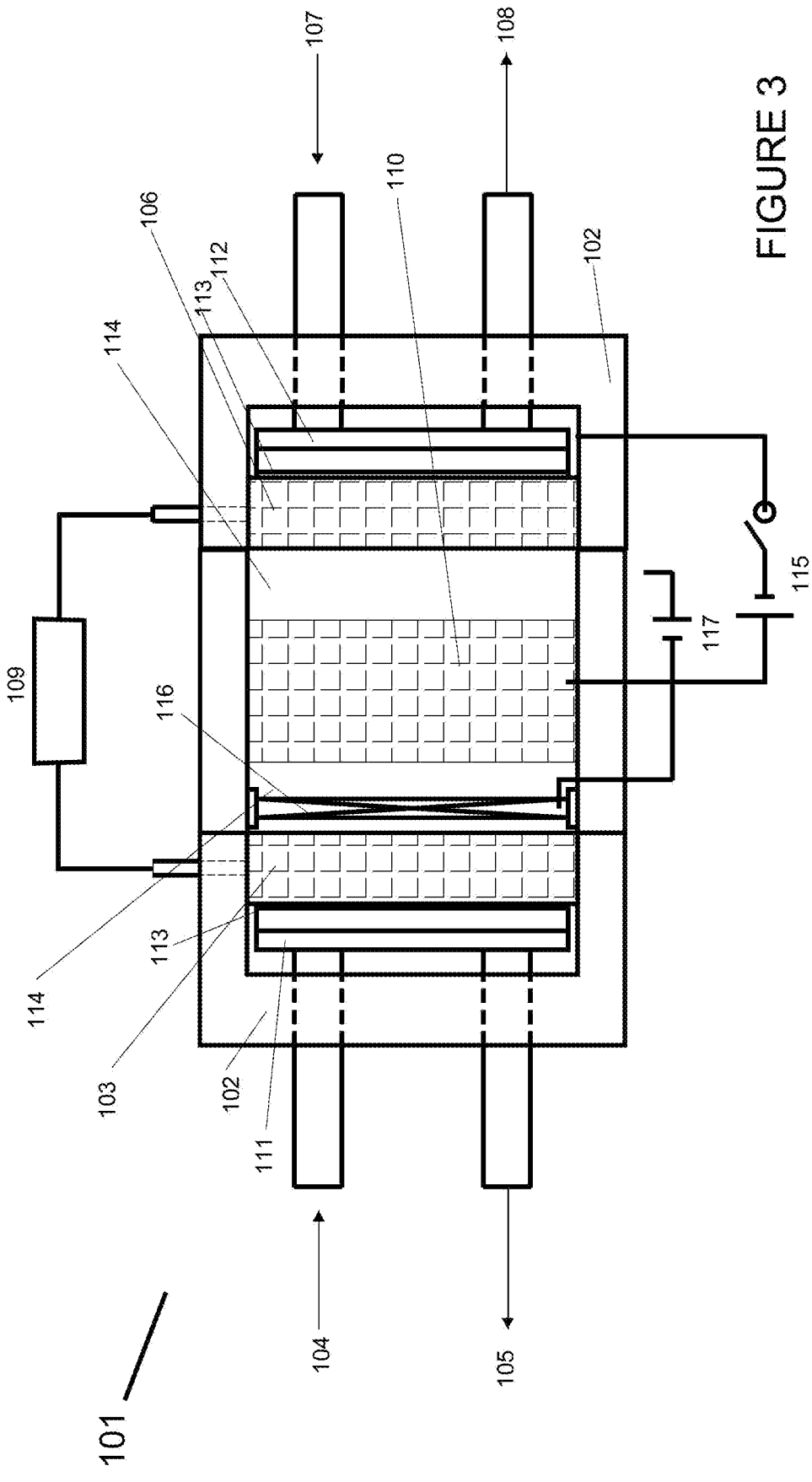
FIG. 3 illustrates an embodiment of an electrolyteless fuel cell system equipped with a screen grid.

FIG. 3 illustrates an embodiment of an electrolyteless fuel cell system equipped with a screen grid 116, which can be used to prevent charged particles generated at the anode (or cathode), from being attracted back to the electrical grid 110 by it being biased to the opposite polarity of the electrical grid 110. As shown in this figure, this can be accomplished through a screen grid power supply 117, in which the negative side of the power supply is connected to the screen grid 116, and the positive side of the power supply is floating.

Material Configuration of Components Used in the Electrolyteless Fuel Cell System Description of the Material Configuration and Power Supply Connections of the Fuel Cell FIGS. 1 to 4 shows the architecture of different embodiments of the present invention.

Figure 3A:
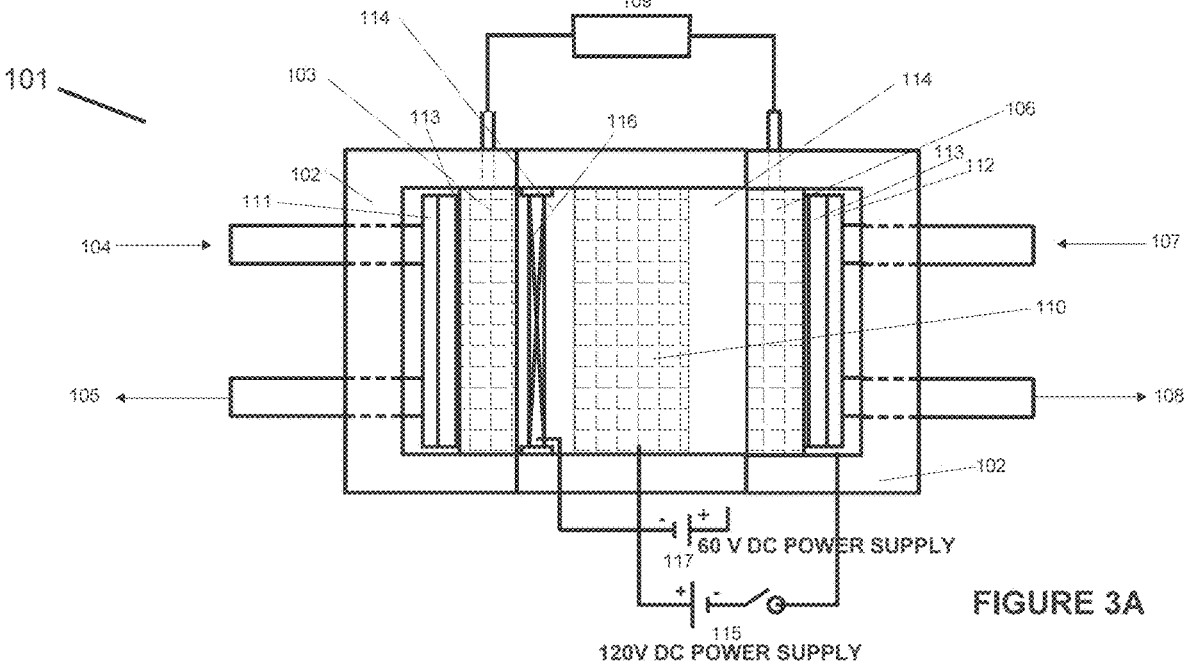
FIG. 3A illustrates material configuration of components used in an electrolyteless fuel cell system.

FIG. 3A shows in detail the material configuration of components and power source voltages and bias along with the details of connections to selected components used in the novel fuel cell system.

Anode 103 is fabricated from porous nickel metal.

Cathode 106 is fabricated from porous nickel oxide material.

Electrical grid 110 is fabricated from nichrome metal.

Anode side grid bias electrode 111 is fabricated from nichrome metal.

Cathode side grid bias electrode 112 is fabricated from nichrome metal.

Insulation 113 used to insulate anode and cathode electrodes from other components is fabricated for operating temperatures below 500 degrees centigrade high temperature silicone is the selected material. For operating temperatures above 500 degrees centigrade the material to be used is ceramic.

Screen grid 110 is fabricated from nichrome metal.

Fuel cell housing 102 is fabricated from aluminum

120 V DC power supply is connected with positive terminal connected to grid 110 and Cathode side grid bias electrode 112 is connected to the negative terminal of the power source.

60 V DC power supply is connected with negative terminal connected to screen grid 116 and the positive terminal of the power source is kept floating.

Further Details of Material Configuration for the Electrolyteless Fuel Cell System Material Configuration of Anode The selected material for anode electrode, 103 as shown in FIG. 3A of the preferred embodiment is porous nickel metal able to operate at the selected temperature. Anode, 103 fabricated from porous nickel will provide oxidation of hydrogen introduced at the anode forming the oxidation stage. The hydrogen undergoing oxidation will split in to positive ions and electrons.

It is important to note that in addition to porous nickel material for the anode it is also possible to use several other metals like platinum or silver. Any metal that is capable of oxidizing hydrogen at the selected operating temperature of the electrolyteless fuel cell system can be used. In addition to the metals it is also possible to use compounds and derivatives of these metals. It is also possible to use ceramic based materials for the fabrication of the anode electrode.

Material Configuration of Cathode

The selected material for cathode electrode, 106 as shown in FIG. 3A of the preferred embodiment is porous nickel oxide able to operate at the selected temperature. cathode, 106 fabricated from porous nickel oxide will provide reduction of oxygen in air introduced at the cathode forming the reduction stage. The oxygen undergoing reduction will split in to positive ions and electrons.

It is important to note that in addition to porous nickel oxide material for the cathode it is also possible to use several other metals like platinum or silver. Any metal or metal oxides that are capable of reducing oxygen at the selected operating temperature of the electrolyteless fuel cell system can be used. In addition to the metals it is also possible to use oxides, compounds and derivatives of these metals. It is also possible to use ceramic based materials for the fabrication of the cathode electrode.

Material Configuration of Grid

The selected material for electrical grid, 110 as shown in FIG. 3A of the preferred embodiment is an electrical conductor fabricated from nichrome metal wires and able to operate at the selected temperature. When Electrical grid, 110 fabricated from nichrome metal wires, an electrical conductive material is provided with a selected polarity of electrical potential, positive or negative, the grid will repel a like electrically charged particle depending on the polarity of the electrical potential and attract oppositely charged particle depending on the polarity of the electrical potential thus provide passage of charged particles of selected polarity.

It is important to note that in addition to nichrome material for the grid it is also possible to use several other metals like steel or titanium. Any metal that is capable of conducting electricity at the selected operating temperature of the electrolyteless fuel cell system can be used. In addition to the metals it is also possible to use ceramic based electrically conductive materials for the fabrication of the grid.

Material Configuration of Anode Side Grid Bias Electrode

The selected material for anode side grid bias electrode, 111 as shown in FIG. 3A of the preferred embodiment is an electrical conductor fabricated from nichrome metal plate able to operate at the selected temperature. The anode side grid bias electrode works in conjunction with grid and the power supply as shown in FIG. 1. The negative terminal of the power supply will be connected to the grid and the positive terminal will be connected to the anode side grid bias electrode, 111 fabricated from nichrome metal plate. This arrangement will provide potential difference between the hydrogen entering the anode area from the flow channel and the grid.

It is important to note that in addition to nichrome material for the anode side grid bias electrode it is also possible to use several other metals like steel or titanium. Any metal that is capable of conducting electricity at the selected operating temperature of the electrolyteless fuel cell system can be used. In addition to the metals it is also possible to use ceramic based electrically conductive materials for the fabrication of the grid.

Material Configuration of Cathode Side Grid Bias Electrode

The selected material for anode side grid bias electrode, 112 as shown in FIG. 3A of the preferred embodiment is an electrical conductor fabricated from nichrome metal plate able to operate at the selected temperature. The anode side grid bias electrode works in conjunction with grid and the power supply as shown in FIG. 1. The negative terminal of the power supply will be connected to the grid and the positive terminal will be connected to the anode side grid bias electrode, 112 fabricated from nichrome metal plate. This arrangement will provide potential difference between the hydrogen entering the anode area from the flow channel and the grid.

It is important to note that in addition to nichrome material for the cathode side grid bias electrode it is also possible to use several other metals like steel or titanium. Any metal that is capable of conducting electricity at the selected operating temperature of the electrolyteless fuel cell system can be used. In addition to the metals it is also possible to use ceramic based electrically conductive materials for the fabrication of the grid.

Material Configuration of Insulation Between Anode and Cathode Electrode and their Corresponding Flow Channels The material to be employed for insulation 113 between anode and cathode electrodes and their corresponding flow channels as shown in FIG. 3A depends on the selected operating temperature of the fuel cell. For operating temperatures below 500 degrees centigrade high temperature silicone is the selected material. For operating temperatures above 500 degrees centigrade the material to be used is ceramic.

It is important to note that in addition to silicone and ceramics materials for the insulation many other insulation materials are also available in prior art. It is also possible to use several other metals like mineral wool, polyimide or carbon fiber.

Material Configuration of Screen Grid

The selected material for screen grid, 110 as shown in FIG. 3A of the preferred embodiment is an electrical conductor fabricated from nichrome metal wires and able to operate at the selected temperature. When Electrical grid, 110 fabricated from nichrome metal wires, an electrical conductive material is provided with a selected polarity of electrical potential, positive or negative, the grid will repel a like electrically charged particle depending on the polarity of the electrical potential and attract oppositely charged particles.

Material Configuration of Fuel Cell Housing

Fuel cell housing 102 will employ aluminum because of light weight corrosion resistance and low cost of aluminum. As shown in FIG. 3A it is selected as the material for the fuel cell housing.

It is important to note that in addition to aluminum material for the housing many other housing materials are also available in prior art. It is also possible to use several other materials like steel and carbon fiber.

Figure 4:
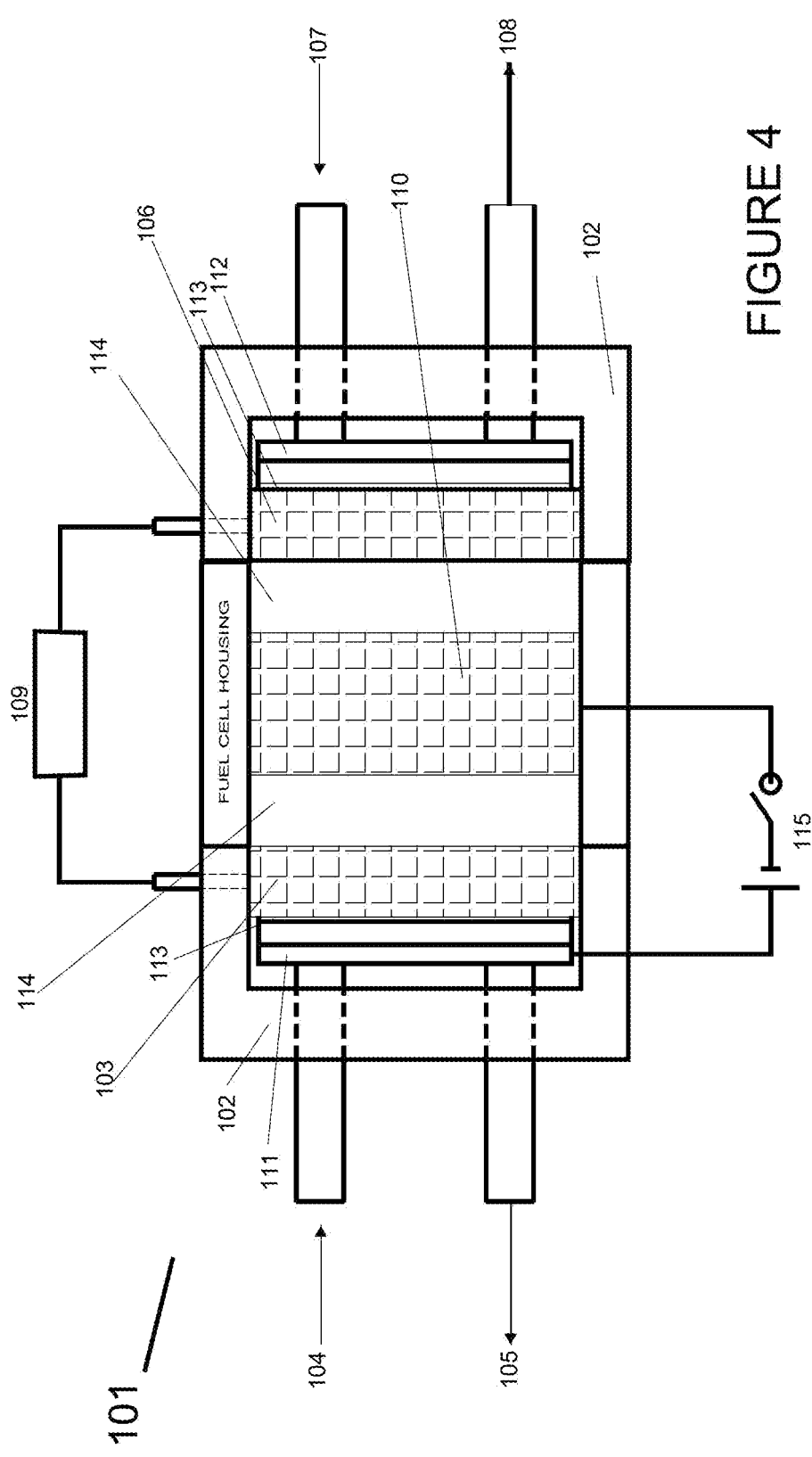
FIG. 4 illustrates an embodiment of an electrolyteless fuel cell system where water production (steam) is formed at the anode area.

FIG. 4 illustrates an embodiment of an electrolyteless fuel cell system using hydrogen and/or carbon monoxide as the fuel source, and oxygen (air) as the oxidant, with water production (steam) performed at the cathode area. When the production of water is performed at the anode area it dilutes the fuel gas concentration affecting the performances of a fuel cell. In one embodiment, according to the disclosed electrolyteless fuel cell, water production is performed at the cathode area and not at the anode area. This is shown in FIG. 4 as described herein. In addition, it can also accomplish internal reforming at the anode area if required. When the water production is achieved at the cathode area it also produces large amount of exothermic heat. This heat can be transferred and used at the anode area to achieve internal reforming. When water production is achieved at the anode area such as prior art SOFC, all the water and steam is produced in the anode area. This production of all the water and steam in the anode area contributes to the dilution of fuel gas due to large amount of water and steam produced at the anode area. In this design, all the steam and water can react with the hydrocarbon fuel such as methane present in natural gas. According to the disclosed electrolyteless fuel cell, all the water produced in the cathode area will not be transferred to the anode area for internal reforming. From the total water produced in the cathode area only optimum amount of steam is injected in the anode area. Only sufficient quantity of the steam necessary for the reforming is injected in the anode area to produce hydrogen and carbon monoxide. All the steam injected in anode area can be used in production of hydrogen and carbon monoxide. This can effectively reduce the leftover steam to contribute to the dilution of the fuel gas.

Prior art fuel cells such as SOFC can only perform internal reforming at the anode area. This leads to dilution of fuel gas entering the anode area which affects the performance of the fuel cell. An important advantage of the disclosed electrolyteless fuel cell is the ability to accomplish internal reforming at the cathode area. It is possible to achieve this when exothermic heat and water is produced at the cathode area. A separate chamber at the cathode area is created to provide and facilitate internal reforming at the cathode area. Steam and exothermic heat produced at the cathode is directed to this chamber and fuel gas such as methane is mixed in this chamber. According to the chemical reactions that can occur in this chamber hydrogen can be released and fed to the anode area where hydrogen can be acting as single fuel and fuel cell reactions as described earlier can proceed. This process can prevent the dilution of hydrogen fuel gas at the anode.

Figure 5:
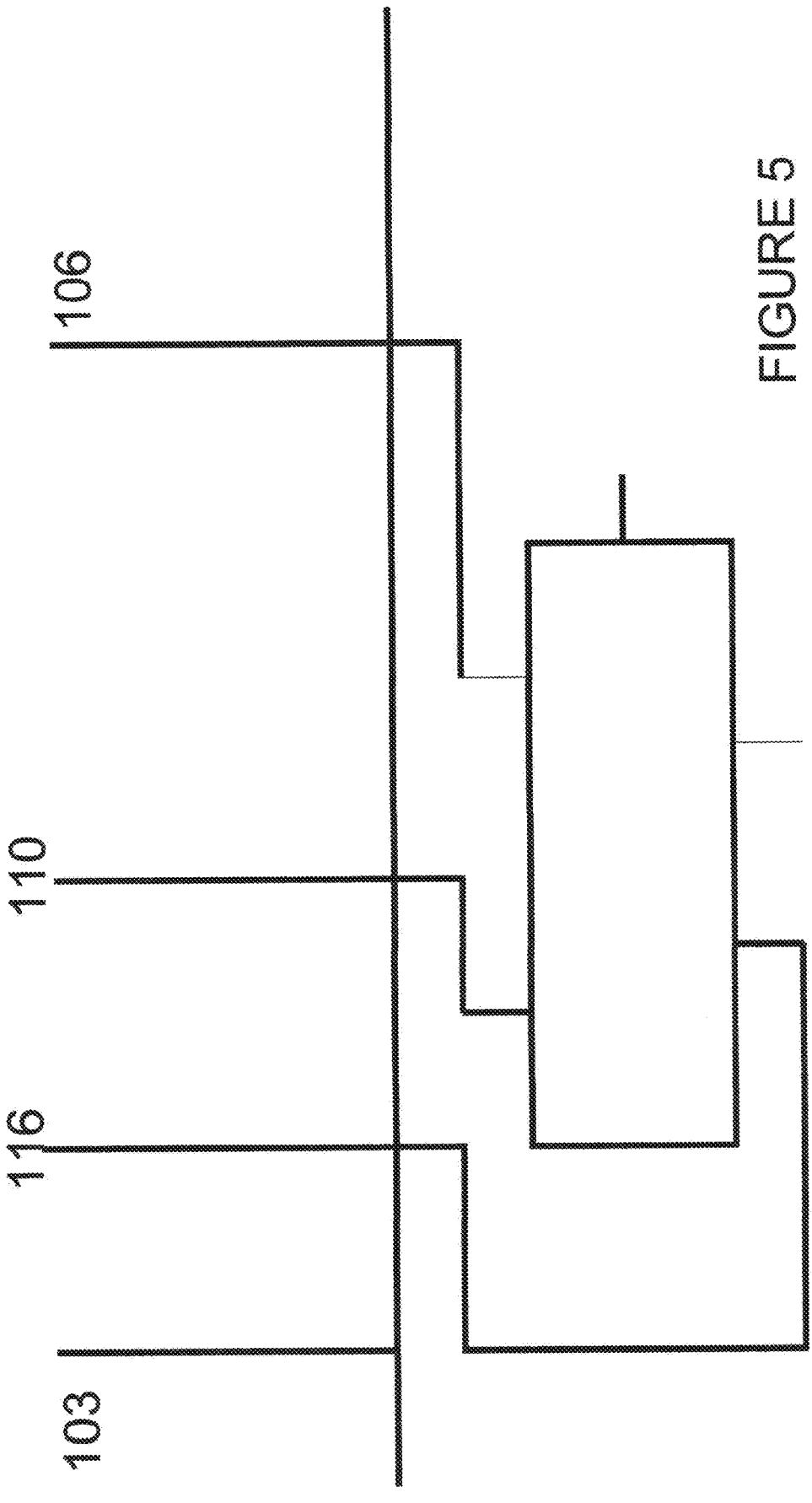
FIG. 5 illustrates an embodiment of a screen grid arrangement for an electrolyteless fuel cell.

FIG. 5 illustrates an embodiment of a screen grid arrangement for an electrolyteless fuel cell. As shown in this figure, the screen grid 116 acts as an additional component to aid in the function of the electrical grid 110. When the electrical grid 110 is maintained at positive potential with respect to cathode 106, negatively charged oxygen ions generated at the cathode 106 are attracted by the positively charged electrical grid 110. The screen grid 116 is located between the electrical grid 110 and the anode 103. The screen grid 116 is maintained at an opposite polarity to the electrical grid 110 (i.e. at a negative polarity); and the screen grid 116 is maintained at a lower potential than the electrical grid 110. The electrical grid 110, having a potential higher than the screen grid 116, can exert a larger force on the negatively charged oxygen ions and force them past the screen grid 116, and further towards the anode 103. Once past the screen grid 116, the negatively charged oxygen ions are prevented from being attracted back to the electrical grid 110 by the negatively charged screen grid 116.

A negatively charged screen grid can perform two functions. First, in the event if negatively charged oxygen ions develops backward pull towards the electrical grid due to higher concentration of ions or fuel cell operational characteristics, the screen grid can prevent them from going back due to negative charge and push them towards anode, and since the electrical grid has higher potential than the screen grid, overall force exerted on the ions can be towards the anode side. Second, the electrons can remain at the anode site and any hydrogen ions trying to move towards the grid can be repelled back to the anode.

The screen grid is generally used in applications where special design considerations require management of charged particles in a specific manner.

A method that can reduce the dilution of fuel gas can be accomplished using carbon dioxide to achieve internal reforming. Carbon dioxide can be introduced in the anode area and reacted with methane to produce carbon monoxide and hydrogen, both of which can be used as fuel for oxidation at the anode area. The exothermic heat produced at the cathode area can be transferred to the anode area for internal reforming. The steam produced at the cathode area can be used for other purposes. This embodiment also allows processing of carbon dioxide produced as a combustion byproduct from other processes to be reduced to less toxic gases. The exothermic heat and steam from the cathode area can be used in external reforming if internal reforming is not desired, and can reduce the cost of steam generator for the external reformer.

Internal reforming has many advantages and the effective design of internal reforming can lead to lower costs and higher efficiencies. In a fuel cell that can accomplish internal reforming, high reforming temperatures are required. The disclosed electrolyteless fuel cell can operate over a wide temperature range and therefore, reforming temperatures are possible without detrimental effects on the performance of the fuel cell. The temperature is not limited by the selection of an electrolyte used in a fuel cell.

One of the main advantages of the disclosed electrolyteless fuel cell is the flexibility provided in operating temperature. Prior art SOFC fuel cells use nickel cermets as an anode material for internal reforming applications. This has many limitations imposed due to high operating temperatures used in prior art fuel cells. For example, if copper or any other metal cermets are used in the anode material, it is possible to gain performance as well as cost and reliability advantages. The ability to use a nickel electrode is also an important advantage and feature of the disclosed electrolyteless fuel cell because nickel is an excellent catalyst for internal reforming reactions. In addition, the low cost of nickel electrodes allows for a lower cost fuel cell. It is possible to operate a fuel cell at a minimum operating temperature required to accomplish internal reforming for the anode side without the need for high temperature cermets. In addition The disclosed electrolyteless fuel cell also offers many different options in terms of how the exothermic heat and steam can be used to accomplish internal reforming as well as the additional use of heat and steam when needed. It is also possible to accomplish partial reforming of fuel gases outside the disclosed electrolyteless fuel cell first before feeding it to the fuel cell. This arrangement can offer some advantages for certain fuel types and power generation architectures.

Two of the important features of the disclosed electrolyteless fuel cell are the ability of the fuel cell to use multiple fuels and use them at selected operating temperatures without any restrictions imposed by electrolyte characteristics. The great flexibility offered by the disclosed electrolyteless fuel cell allows the use of fuels over a wide range of hydrocarbon spectrum available at very low prices. The fuels that can be used can consist of hydrocarbons from natural gas and biomass gas to coal gas to different alcohols. These fuels lend themselves to internal reforming. When internal reforming is used or when external reforming with carbon monoxide in the fuel gas is used it is desirable that proper oxidation of both the gases is achieved in the fuel cell.

Many different anode and cathode designs have been used in the past and progress is being made very rapidly. However, with the disclosed electrolyteless fuel cell the restrictions imposed by prior art electrolytes are eliminated offering great flexibility in selection of material and design of anode and cathode.

There may be situations when a backflow from the electrical grid back to anode or cathode can occur. It can also occur between all the components of the fuel cell system. A diffusion barrier can be used between the different electrodes or the electrical grid. The diffusion barrier can prevent back flow of fuel or charged particles. The diffusion barrier can be made from carbon fabric or other similar component that would allow diffusion in desired direction.

An accurate supply of grid bias to the grid is very important for the proper operation of the fuel cell according to disclosed electrolyteless fuel cell. It is possible to design many different design configurations of the power supply to bias the grid. The primary design goal is to maintain the bias polarity of grid with respect to the anode and cathode circuits as the design dictates. The proper isolation of anode, cathode and grid circuits are also critical when required.

Most prior art fuel cells do not have rapid starting feature. Fuel cells like SOFC have many advantages but have very poor starting characteristics. The disclosed electrolyteless fuel cell offers fuel cells the ability to start very rapidly which is a very important requirement for applications like automotive and backup power sources.

The disclosed electrolyteless fuel cell does not have electrolytes that can require time consuming pre-activation as needed in prior art fuel cells. The rapid starting is achieved by conducting large current through both anode and cathode for a sufficient time which can quickly increase the temperature of the electrodes to operating temperature. This can allow the electrodes to start functioning immediately. This can occur because high temperatures allow the right conditions for reactivity to start immediately.

Figure 6:
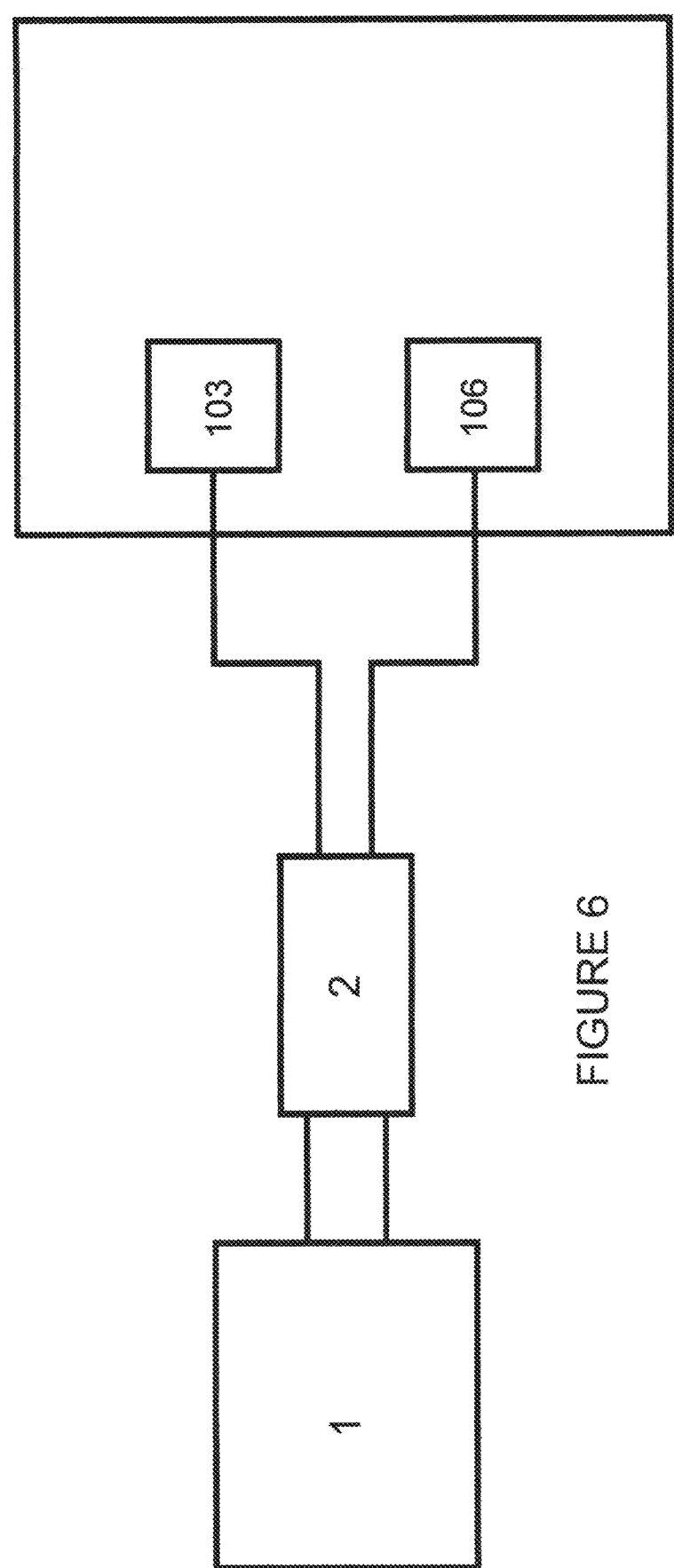
FIG. 6 illustrates an embodiment of a startup circuit for an electrolyteless fuel cell.

FIG. 6 illustrates an embodiment of a startup circuit for an electrolyteless fuel cell. Power supply 1 can provide necessary electrical current to the electrodes. Control and switching circuit 2 can control the amount of current and the necessary time to bring the electrodes to operating temperature. After this is achieved the current to the electrode is turned off and the fuel cell can begin normal operation.

Electrolyzer

A novel electrolyteless fuel cell has been disclosed earlier in the specification. For the hydrogen economy to succeed it is also necessary to generate hydrogen efficiently and economically. A novel electrolyteless electrolyzer able to produce hydrogen from water is also developed by the present inventor.

Electrolyzers use electricity to break water into hydrogen and oxygen. In a fuel cell, the anode is where hydrogen gas is consumed, and in an electrolyzer, the hydrogen gas is produced at the cathode. The electrolyzer requires electrical energy to complete the reaction.

Electrolyzer use electricity to break water into hydrogen and oxygen. The electrolysis of water occurs through an electrochemical reaction that does not require external components or moving parts.

Novel electrolyzer according to the present invention use an electrical grid that selectively conducts negatively charged oxygen ions ($O^{2-}$) generated at cathode to the anode to generate hydrogen in a slightly different way.

Water at the cathode combines with electrons from the external circuit to form hydrogen gas and negatively charged oxygen ions.

The oxygen ions pass through an electrical grid by electrostatic action of the grid and react at the anode to form oxygen gas and generate electrons for the external circuit.

The operation of the novel electrolyzer can be explained by the following equations.

Water is reduced at the cathode equation 1 releasing hydrogen and oxygen ions.

$$H_2O + 2e^- \rightarrow H_2 + O^{2-}$$

After crossing the electrical grid the ions are then being oxidized to form oxygen within the anode as explained by equation 2.

$$O^{2-} -> \frac{1}{2}O_2 + 2e^-$$

Finally both half reactions expressed by equations 1 and 2 are balanced by general equation 3.

$$H_2O -> H_2 + \frac{1}{2}O_2$$

Figure 7:
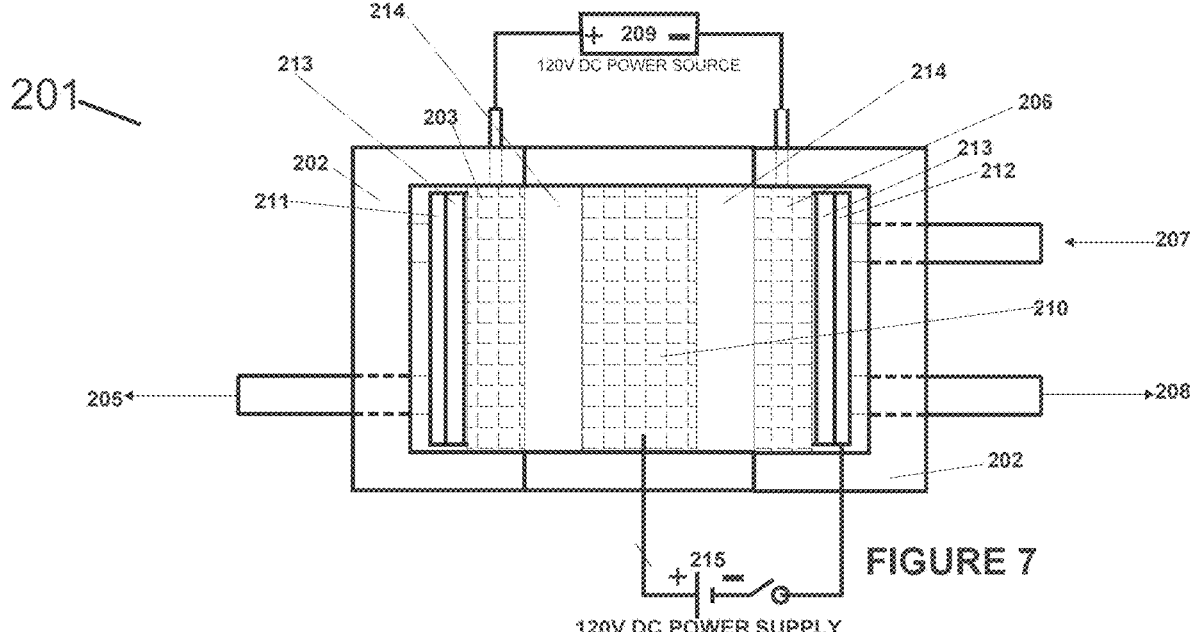
FIG. 7 illustrates an embodiment of an electrolyteless electrolyzer cell system.

A preferred embodiment of an electrolyzer according to present invention is shown FIG. 7. The cathode is made from porous nickel oxide and the anode is fabricated from porous nickel metal.

An electrical grid is located between cathode and anode. The electric grid is fabricated from metal like nichrome.

Voltage is applied between cathode and anode as shown in FIG. 7. Steam is introduced at the cathode side. A chemical reaction will convert steam in to hydrogen gas and oxygen ions.

FIG. 7 illustrates an embodiment of an electrolyteless electrolyzer cell system 201. The electrolyteless electrolyzer cell system 201 includes a fuel cell housing 202; an anode 203; and an anode side outlet 205 (for allowing oxygen to exit); a cathode 206; a cathode side inlet 207 (for allowing steam to enter), and a cathode side outlet 208 (for allowing hydrogen produced to exit). The anode is fabricated from porous nickel metal and cathode is fabricated from nickel oxide material, with their necessary catalytic properties. Also shown in FIG. 7 is an external source of electrical power supply 209 which is a 120 volt DC source of power. The housing is fabricated from aluminum and electrically insulated from the electrodes and the grid. All the connections to the anode, cathode and the grid are made as shown in FIG. 7 through the DC power source 209 supply terminals and 120 volt DC power source 215 only and no direct connection exists between the anode, cathode and the grid.

The electrolyteless electrolyzer cell system 202 also includes an electrical grid 210, which is made from nichrome metal and is able to operate at variable temperatures. The electrical grid 210 is mainly open space and because of that, negatively charged ions such as oxygen ions, do not attach to the electrical grid.

The electrolyteless electrolyzer cell system 202 also includes a cathode side grid bias electrode 212, which includes a plurality of flow channels or grooved paths for flow of steam entering the cathode and hydrogen leaving the fuel cell system; A flow channel insulation material 213 is spaced between the cathode side grid bias electrode 212 and the cathode 206. In addition, an air gap 214 is located between the anode 203 and the electrical grid 210, as well as between the cathode 206 and the electrical grid 210. Anode side also includes an anode side output electrode 211 with plurality of flow channels or grooved paths for flow of oxygen from the anode. Anode side output electrode is insulated from anode by insulation.

When using cathode for reduction of steam in the electrolyteless electrolyzer cell system 210, the electrical grid 210 can be biased positive with respect to the cathode 203. This can be accomplished through a grid power supply 215, in which the positive side of the power supply is connected to the electrical grid 210, and the negative side of the of the power supply is connected to the cathode side grid bias electrode 212. The grid power supply 215 will be isolated from the housing.

Operation of the Electrolyteless Electrolyzer

The steam entering the cathode 206, by catalytic action of the cathode, goes through the process of reduction and is oxidized into negatively charged oxygen ions and hydrogen gas. In this embodiment, the electrical grid 210 is biased positive with respect to the cathode 206 because of this the negatively charged oxygen ions will be pulled toward the grid and the grid being mostly empty space the oxygen ions will move to the anode 203. The negatively charged oxygen ions can also tend to move towards the anode 203 side of the fuel cell due to the pressure of the incoming steam entering the flow channels in the cathode side grid bias electrode 212.

When the oxygen ions pass through an electrical grid by electrostatic action of the grid and react at the anode 203, this action forms oxygen gas and generate electrons for the external circuit.

The oxygen is then taken out by anode side outlet 205.

Water Management in Electrolyzer

Electrolyzer employs steam to generate hydrogen. There are embodiments of electrolyzers which may require water management several different methods of water management are available in prior art. These methods can be efficiently employed in the electrolyzer according to the present invention.

Screen Grid in Electrolyzer

Concept and implementation of screen grid has been described in FIG. 3 for the fuel cell. Identical techniques can be employed in electrolyzer when needed.

The successful implementations of technology based on the disclosed electrolyteless fuel cell can revolutionize the concept of how power and energy is generated and used in portable as well as stationary applications. The major beneficiaries of the technology would be automotive and shipping industry. These two industries are major contributors to the production of carbon dioxide and other pollutants. The disclosed electrolyteless fuel cell can bring the hope of carbon free environment one step closer to reality.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. An electrolyteless fuel cell system, comprising:
   an anode;
   a cathode;
   an electrical grid between the anode and cathode;
   an anode side grid bias electrode;
   a cathode side grid bias electrode;
   a first air gap between the anode side grid bias electrode and the electrical grid;
   a second air gap between the cathode side grid bias electrode and the electrical grid; and
   an electrical grid power supply,
   wherein the electrical grid is biased negative with respect to the anode through the anode side grid bias electrode and the electrical grid power supply, or
   wherein the electrical grid is biased positive with respect to the cathode through the cathode side grid bias electrode and the electrical grid power supply.

2. The fuel cell system of claim 1, wherein the electrical grid is biased negative with respect to the anode, to create a potential difference between the electrical grid and the anode, wherein incoming hydrogen is used as a fuel source at the anode.

3. The fuel cell system of claim 2, wherein the negatively biased electrical grid pulls protons generated by oxidation of the incoming hydrogen at the anode, towards the electrical grid.

4. The fuel cell system of claim 3, wherein the negatively biased electrical grid repels electrons generated by oxidation of the incoming hydrogen at the anode, away from the electrical grid and to the anode.

5. The fuel cell system of claim 1, wherein the electrical grid is biased positive with respect to the cathode to create a potential difference between the electrical grid and the cathode, wherein incoming oxygen is used as an oxidant at the cathode.

6. The fuel cell system of claim 5, wherein the positively biased electric grid pulls oxygen anions generated by reduction of the incoming oxygen at the cathode, towards the electrical grid.

7. The fuel cell system of claim 1, further comprising:

a plurality of flow channels in the anode side grid bias electrode and in the cathode side grid bias electrode, wherein the plurality of flow channels in the anode side grid bias electrode allows incoming hydrogen to reach the anode, and wherein the plurality of flow channels in the cathode side grid bias electrode allows incoming oxygen to reach the cathode.

8. The fuel cell system of claim 1, further comprising:

a screen grid located between the electrical grid and the anode, or located between the electrical grid and the cathode, wherein the screen grid is maintained at an opposite polarity and at a lower potential to the electrical grid.

* * * * *